United States Patent [19]

Dreinhoefer et al.

[11] 4,234,832

[45] Nov. 18, 1980

[54] ON-LINE SWITCHING BETWEEN TWO CONTROL PARAMETERS

[75] Inventors: Louis H. Dreinhoefer, Murrysville, Pa.; David W. Nolen, Evansville, Ind.; Paul C. Donatelli, Trafford, Pa.

[73] Assignee: Aluminum Company of America, Pittsburgh, Pa.

[21] Appl. No.: 53,846

[22] Filed: Jul. 2, 1979

[51] Int. Cl.³ .............................................. H02P 5/24

[52] U.S. Cl. .................................... 318/146; 318/156; 318/255

[58] Field of Search ............... 318/141, 142, 143, 144, 318/146, 156, 157, 158, 255, 271, 609, 610; 290/40 R; 322/69, 70, 73, 596

[56] References Cited

U.S. PATENT DOCUMENTS

| | | | |
|---|---|---|---|
| 3,882,368 | 5/1975 | Carleton | 318/610 |
| 4,031,372 | 6/1977 | Davis | 290/40 R |
| 4,053,746 | 10/1977 | Brautenbah et al. | 290/40 R |
| 4,056,331 | 11/1977 | Sato | 290/40 R |

*Primary Examiner*—J. V. Truhe
*Assistant Examiner*—John W. Redman
*Attorney, Agent, or Firm*—Elroy Strickland

[57] ABSTRACT

A control method and circuit providing smooth transition between two regulating modes involving two regulating parameters, one active and one inactive. The method comprises the steps of providing a reference signal and developing a signal representing the inactive parameter. The two signals are then compared to provide an inactive output signal that is indicative of any difference existing between them. Another signal is developed that represents the active parameter, and this signal is compared to the inactive output signal. The inactive output signal is then forced continuously to the value of the signal representing the active parameter when the values of the two signals are different. Change from the one parameter and mode to the other parameter and mode can now be made without a disturbing effect.

1 Claim, 1 Drawing Figure

E
12
16
14
20
24
13
EXCITER
22
18
19
36
40
39
10
32
44
39
49
42
48
28
26
30
38
46
47

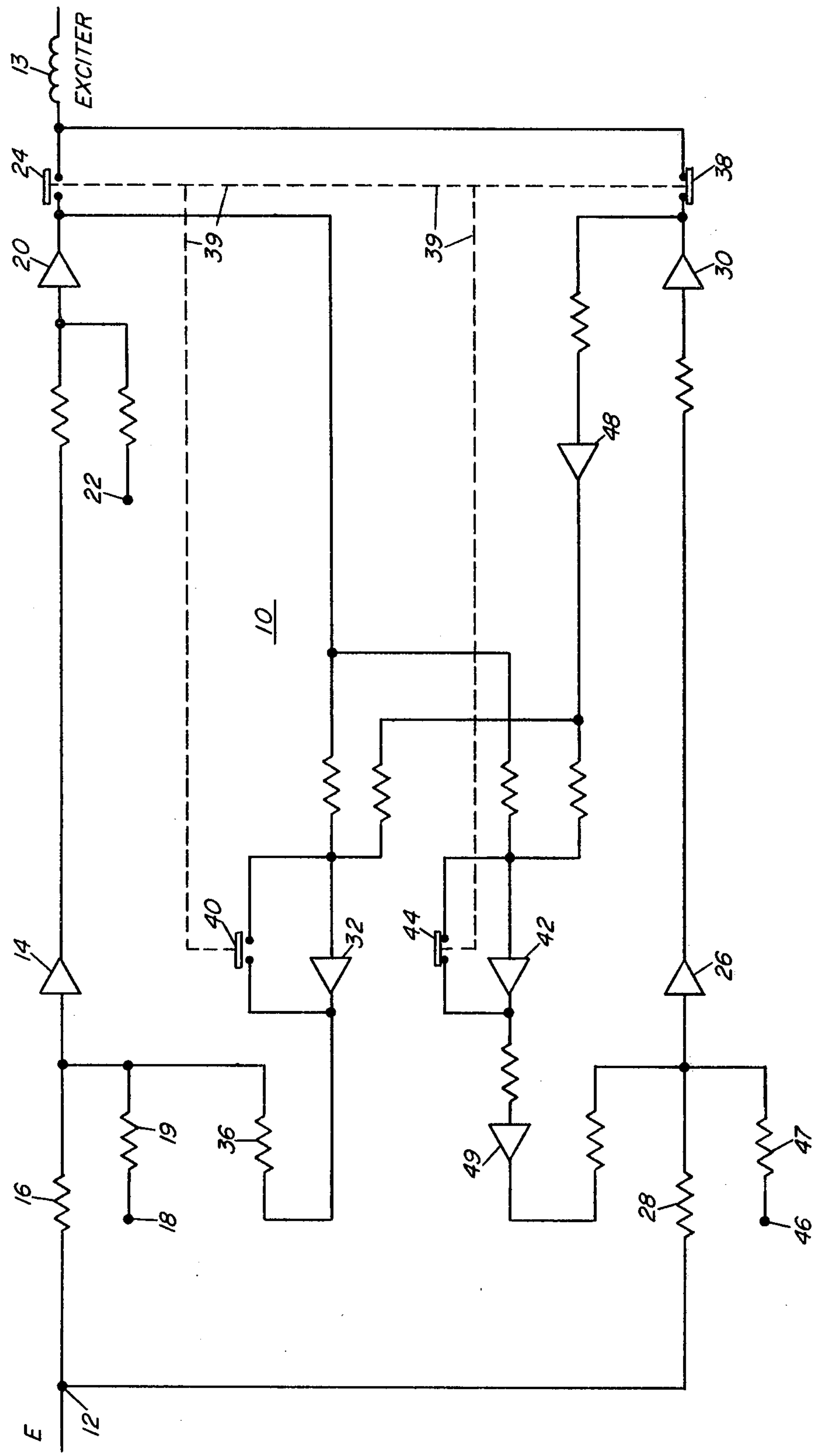
EXCITER
13
24
38
39
39
20
30
22
48
10
40
32
44
42
14
26
36
19
49
16
18
28
47
46
E
12

ON-LINE SWITCHING BETWEEN TWO CONTROL PARAMETERS

BACKGROUND OF THE INVENTION

The present invention relates generally to the control of electrically operated apparatus, and particularly to a method and circuit arrangement which allows switching between two regulating modes without disrupting the process being regulated.

In the process of reducing the thickness of metal in a rolling mill, for example, there are times when it is desirable to change from a speed control parameter to that of say a voltage control parameter, and vice versa. For example, in threading a rolling mill, a speed regulating parameter is not a suitable parameter for regulation, as any speed mismatch between the stands of the mill will result in a changing tension on the material between the stands. Hence, another regulating parameter is needed, such as thatprovided by the use of voltage regulating means. Such means provide a "softer" way to control slow rotation of the rolls in the process of threading metal sheet or strip into and through each stand. The process feedback of sheet loading to the drives of the stands forces each drive to "droop" the required amount for a perfect speed match. After the mill is threaded and its speed increased to a run speed for normal processing of the metal, both tension and speed parameters are available for regulating purposes, whereas a voltage regulating method permits control during relatively slow operations of the mill and therefore facilitates the threading process.

However, in switching or changing between a voltage regulation mode and a tension or speed regulation mode, disruption of the rolling process can occur if the magnitudes or levels of the control signals involved are completely different. For example, if the level of a control voltage, as an active, regulating parameter, is substantially below that of the level of an inactive speed reference, a substantial instantaneous increase in speed will be ordered when the mill is switched to a speed regulating mode, thereby placing substantial instantaneous tension on the metal to the extent that the metal may break. On the other hand, if the active, regulating voltage level is high and the inactive speed control level is low, the mill immediately slows, when switched to speed regulation, thereby tending to pile up metal between stands or between payoff apparatus and the first stand.

Therefore, what is needed in the control art is a means to provide a smooth transition between two different regulating modes so as not to upset the process under regulation.

BRIEF SUMMARY OF THE INVENTION

The present invention provides such a smooth transition by developing a signal representing an inactive regulating or control parameter and comparing this signal to a reference signal and to a signal developed in response to an active regulating parameter. If the sum of the three signals is not zero, a signal is produced that is indicative of the magnitude and polarity of the sum and is continuously employed to change the level of the inactive parameter to that of the active parameter. Then, when switchover is made from the active parameter to the inactive parameter, which now becomes the active while the previous active becomes inactive, the magnitude of two regulating signals will be equal; in this manner, the controls of the apparatus being regulated experience no change in the regulation effected when the change is made.

THE DRAWING

The invention, along with its objectives and advantages, will best be understood from the following detailed description and the accompanying drawing, the sole FIGURE of which is a flow diagram of the circuit arrangement of the invention.

PREFERRED EMBODIMENT OF THE INVENTION

Referring now to the drawing, a circuit arrangement 10 is shown, to which a reference voltage or signal E is made available at a terminal 12 of the arrangement. This voltage reference may be a speed reference, and the circuit 10, as described below, is adapted to control the speed of the motor of a motor-generator set, not shown, hereinafter referred to as an MG set, though the invention is not limited thereto. A winding 13 of a voltage regulator (not otherwise shown in the drawing) for controlling the field of the generator of the set is shown on the right-hand side of the drawing, i.e. the value of the voltage applied to 13 controls excitation of the generator field.

The input of an operational amplifier 14 is shown connected to terminal 12 through a resistor 16 approximately sized to precisely control the gain of the reference. A second terminal 18 is provided for directing a second signal to the input of amplifier 14 through a resistor 19. In the embodiment of the invention depicted in the drawing, the signal provided at terminal 18 is developed by a tachometer (not shown) mechanically connected to the armature of the motor (not shown) of the above MG set. As will become obvious from the following description, parameters other than motor speed can be directed to amplifier 14 and utilized in a manner similar to the operation explained hereinafter.

Amplifier 14, like all of the amplifiers in the present disclosure, is a typical operational amplifier which functions to invert the polarity of the net input to the amplifier, the gain of all inputs being fixed by appropriate input resistors. Similarly, all amplifiers employed in the circuit arrangement of the invention have feedback elements. They have not been shown in the drawing to avoid making the drawing unduly complicated. If the result of the combination of input signals to 14, for example, is a positive voltage of a predetermined magnitude, the output of 14 will be a negative voltage of some other magnitude. However, with the amplifiers properly controlling the operation of 13, the net input to each amplifier is zero, with the output thereof being steady state.

In addition, as is known in the art, an operational amplifier may be a proportional, proportional-integral, or proportion-integral-derivative type, depending on the particular requirements of the circit involved. Hence, amplifier 14, as well as amplifiers 20, 26 and 30, discussed hereinafter, may be one of these types.

The output of amplifier 14 is serially connected to the input of a second operational amplifier 20, as shown in the drawing. In addition, a third terminal 22 is provided to receive and direct a signal to the input of 20, such signal, in keeping with the above application of circuit 10, representing the current in the armature of the motor of the MG set.

The output of amplifier 20 is connectable, via relay contacts 24, to the winding of regulator 13. In the drawing, contacts 24 are shown open, the contacts being opened and closed by the operation of an associated solenoid not shown.

The input of a third operational amplifier 26 is shown connected to terminal 12 via a resistor 28. The output of 26, in turn, is connected to the input of an operational amplifier 30, the output of 30 being connectable to exciter 13 through relay contacts 38. The output of 30 is also connected to the inputs of two additional amplifiers 32 and 42, via yet another amplifier 48, for purposes explained hereinafter. Contacts 38 are ganged with those of 24 and with contacts 40 and 44, as indicated by dash lines 39, located respectively across amplifiers 32 and 42. However, in the mode of operation shown in the drawing, amplifier 42 is shorted by contacts 44 while contacts 40 are open, thereby placing 32 between the output of 20 and the input of 14. A resistor 36 connects the output of 32 to the input of 14.

The operation of the circuit of the FIGURE is as follows. When a motor is operated at a low speed, such as when a rolling mill driven by the motor or an MG set is being threaded with material to be rolled, as explained above, the mill is sensitive to speed mismatches without tension control. In the threading process, a voltage regulated stand without metal runs faster than the actual speed required. Once the metal bite is established in that stand, the sheet tension loading "droops" the drive of that stand to a proper speed match. In the circuit arrangement 10 (of the drawing), amplifiers 26 and 30 apply a voltage, which is now the active controlling parameter, to voltage regulator 13 through closed relay contacts 38. Amplifier 26 receives as an input, in this process, the speed reference voltage E applied at terminal 12 and a signal representing the voltage in the armature of the motor of the MG set. The signal from the armature is applied to an input terminal 46 and series resistor 47. Resistors 28 and 47 provide a net input voltage of zero for amplifier 26 with 26 providing a proper voltage control function. Any difference occurring between the levels of the signals from 28 and 47 is amplified by 26 and is applied to the input of 30.

Amplifier 30 is employed simply, and again in a well-known manner, to invert the polarity of the regulating voltage from 26 so that such polarity is proper for regulator 13. The voltage from 26 and 30 provides an appropriate slow speed for the motor of the MG set associated with 13.

After the mill is properly threaded, the speed of the mill can be gradually increased to its running speed by ramping (increasing) the voltage E applied to terminal 12, i.e. with each increase in E, the net input to 26 (and 30) is of a polarity and magnitude that increase the voltage applied to 13. This causes an increase in the voltage of the armature of the motor of the MG set. The signal representing armature voltage reflects this increase, as it is applied to 26 via terminal 46 and resistor 47. The two inputs to 26 thereby become even with each increment of increase in E so that the net input to 26 for each increment goes to zero, as discussed above. When the speed of the mill and the motor of the MG set reach an appropriate running speed, they can be regulated by a speed regulating means, which is presently inactive.

However, before speed regulation is accomplished, i.e. before the above mode of voltage regulation is changed over to the inactive, speed regulating mode, the output value of amplifier 20 should be the same as that of 26. This will insure that the signal reaching 13, when contacts 24 are closed and contacts 38 are opened for the changeover, will have the same magnitude. As explained above in the case of a rolling mill, an abrupt change in control might so increase the speed of the mill such that the material being rolled in the mill undergoes an increase in the tension on the material (between the stands of the mill) sufficient to break the material. Or, the mill will be slowed to the extent that tension on the material is abruptly reduced, thereby causing accumulation and sagging of material entering the mill. Hence, changing over to speed control from voltage control should be smooth to avoid such problems.

The arrangement of the present invention provides such a smooth changeover by use of amplifier 32, which functions to match the output of amplifier 20 with that of amplifier 30. The output of 30 is directed to the input of 32 via amplifier 48. Amplifier 48 inverts the output of 30, which is the same polarity as that of amplifier 20, to provide a zero voltage input to 32. The output of amplifier 32 is placed in the input circuit of amplifier 14, and the output circuit of 20 is connected into the input of 32 by virtue of open relay contacts 40.

32 is an operational amplifier that functions to continuously compare the output voltage of 30, with the output voltage of 20, and to force the level of the output of 20 to that of the output of 30 if the two are different. For example, if the level of the output of 30 is less than that of 20, 32 "sees" this difference at its input, and sees 30 as being negative with respect to 20. 32 inverts the difference and, therefore, provides an inverted output voltage of the difference. This inverted output is directed to the input of 14 via resistor 36, the gain of the voltage from 32 being controlled by resistor 36.

The input to 14 from 32 is now compared to the voltages applied to 14 at terminals 12 and 18. The voltage levels at 12 and 18 will reflect a steady state condition as a result of the output of the above tachometer increasing with the above ramping up of voltage E, applied at 12. Hence, the voltage coming from 32 is different by the amount of the difference between 20 and 30. This difference is inverted (again) in the output of 14, and directed to the input of 20. The polarity and magnitude of this output are now the same as that originally presented to the input of 32.

Amplifier 20 compares the output of 14 with the armature signal applied at 22. Again, armature current will have increased to a steady state value with the ramping of E to attain running speed, while the voltage directed to 20 from 14 will be different therefrom by the amount of the difference existing between 20 and 30. For the third time, this difference is inverted, such that the output of 20 is now of a polarity opposite the voltage difference occurring between 20 and 30. This, of course, removes the difference such that the output of 20 is brought down to the level of the output of 30 and thus the level of the voltage applied to regulator 13 via contacts 38. The process under control is now ready for changeover.

If the output of 30 had been more than that of 20, 32 would have continuously functioned in the opposite manner to drive up the output of 20 until it matched that of 30.

With the outputs of 20 and 30 matched, a changeover to speed control from voltage control will be smooth, as regulator 13 will not "see" or experience a signal that has a level different from the previous control signal.

The changeover is accomplished by the simultaneous opening of contacts 38 and 44 and the closing of contacts 24 and 40. The closing of contacts 24 connects the output of 20 to regulator 13 for speed regulation, while the opening of 38 removes 30 and 26 from the circuit of 13. Similarly, compensating amplifier 32 is removed from the circuit of 14 and 20, by contacts 40, while a second compensating amplifier 42 is placed in the input circuit of 26 by the opening of contacts 44. With contacts 40 being closed around amplifier 32, the output thereof is zero.

Reference signal E is chosen and set to provide a proper running speed for the motor and mill to be controlled. Amplifier 14 is a speed regulating amplifier which receives both the reference voltage E and a voltage applied at terminal 18 representing the speed of the armature of the motor. The voltage can be generated by a tachometer associated with the armature. Amplifier 14 algebraically adds the two signals so that any difference between them will appear in the output of 14, and hence as input reference to amplifier 20. The polarity (direction) of the difference will depend upon the direction in which the difference occurs, i.e. if the speed of the motor is below that set by reference E, the output of 14 will be of one polarity; if motor speed is above that established by E, the output of 14 will be of the other polarity.

Like amplifier 26, 20 is a regulating amplifier which uses the output of 14 as a current reference for comparison with the signal representing the current flowing in the armature of the motor. Any difference between these two is amplified by 20 and directed to voltage regulator 13, through relay contacts 24, which are now closed, for speed regulation of the motor. The signal output of 20 is used to drive voltage regulator 13 in the direction opposite of the direction (polarity) of the voltage difference existing between terminals 12 and 18, and the voltage difference occurring between the input to amplifier 20 (from 14) and the voltage representing armature current presented at terminal 22. When the voltage to 13 is returned to the amount required for the proper speed of the motor, i.e. the speed as predetermined and preset by the reference voltage E at 12, the above tachometer will output a voltage to terminal 18 and amplifier 14 that is the same as reference voltage E. The output of 14, in turn, will be a steady state voltage, equal in magnitude to the voltage representing the current in the motor armature, as presented at terminal 22, armature current having changed to be equal to that appearing from the output of 14. In this manner, the speed of the motor is automatically controlled and maintained.

Amplifier 42 permits a return to voltage regulation in a smooth manner, remembering that contacts 44 around 42 are open in the speed regulating mode. The output of 30 is matched to 20 by 42 in a manner similar to that effected by 32 in matching 20 and 30. The output of 42 is inverted by an amplifier 49 to provide correct signal polarity for the input of 26 in the process of forcing the output of 30 to match that of 20.

Since the outputs of 20 and 30 are matched, the above relay solenoid (not shown) can be de-energized to make the changeover (again) to voltage control by opening contacts 24 and 40, and closing contacts 38 and 44, simultaneously, contacts 38 now (again) applying the voltage output of 30 to regulator 13. The open contacts 40, of course, again allow the matching of the output of 20 to that of 30 so that when changeover to speed control is ordered, it will be (again) smooth.

While the invention has been described in terms of preferred embodiments, the claims appended hereto are intended to encompass all embodiments which fall within the spirit of the invention.

What is claimed is:

1. A circuit arrangement adapted to provide smooth transition between voltage and speed control of the motor of a motor-generator set, comprising a first circuit means for comparing a voltage reference signal and a signal representative of the speed of the motor of the set, and providing an output signal that is indicative of any difference existing between the levels of the voltage reference and speed signals, a second circuit means connected to receive the output signal from the first circuit means and a signal representative of the current in the armature of the motor, and for producing a second output signal that is indicative of any difference existing between the first output signal and the current in the motor armature, means for directing the output of the second circuit means to a voltage regulator of the generator to maintain excitation of the generator field at a value determined by the voltage and current references, means for disconnecting the voltage regulator of the generator from the second circuit means, a third circuit means for developing a voltage control signal for the generator field, and means for applying this signal to the generator field when the field is disconnected from the second circuit means, and a fourth circuit means for comparing the voltage control signal developed by the third circuit means to the output of the second circuit means, and for causing said output of match that of the voltage signal developed for the voltage regulator.

* * * * *